United States Patent [19]
Wanger

[11] 3,814,324

[45] June 4, 1974

[54] PROPULSION NOZZLE AND ACTUATOR SYSTEM EMPLOYED THEREIN

[75] Inventor: Robert Price Wanger, Fairfield, Ohio

[73] Assignee: General Electric Company, Lynn, Mass.

[22] Filed: June 19, 1972

[21] Appl. No.: 264,394

[52] U.S. Cl. .......................... 239/265.31, 239/127.3
[51] Int. Cl. ........................ B64d 33/04, B64c 9/38
[58] Field of Search .................. 181/33 HC, 33 HD; 239/265.11, 265.13, 265.17, 265.25, 265.31, 265.33, 265.19, 127.3

[56] References Cited
UNITED STATES PATENTS

| | | | |
|---|---|---|---|
| 3,237,864 | 3/1966 | Taylor et al. | 239/127.3 |
| 3,262,264 | 7/1966 | Gardiner et al. | 239/265.19 |
| 3,262,268 | 7/1966 | Beavers | 239/265.19 |
| 3,262,269 | 7/1966 | Kutney et al. | 239/265.19 |
| 3,262,270 | 7/1966 | Beavers | 239/265.19 |
| 3,262,271 | 7/1966 | Beavers | 239/265.19 |
| 3,347,467 | 10/1967 | Carl et al. | 239/265.31 |
| 3,352,494 | 11/1967 | Colville et al. | 239/265.13 |
| 3,500,644 | 3/1970 | Horn et al. | 239/265.31 |
| 3,591,085 | 7/1971 | Medawor et al. | 239/265.13 |

FOREIGN PATENTS OR APPLICATIONS

| | | | |
|---|---|---|---|
| 588,873 | 12/1959 | Canada | 239/265.31 |
| 1,458,200 | 10/1966 | France | 239/265.31 |
| 1,287,444 | 1/1969 | Germany | 239/265.31 |
| 764,907 | 1/1957 | Great Britain | 239/265.31 |
| 838,038 | 6/1960 | Great Britain | 181/33 HD |

*Primary Examiner*—Robert S. Ward, Jr.

[57] ABSTRACT

A propulsion nozzle is described in combination with a gas turbine engine. The hot gas stream of the engine is discharged through the nozzle for forward propulsion, or may be discharged laterally thereof for reverse thrust. The nozzle is of the variable geometry, plug type wherein flaps are pivotal to vary the discharge and throat areas thereof for different flight conditions spanning subsonic and supersonic operation. The flaps for controlling discharge area are pivotally mounted on a frame which is longitudinally displacable to uncover ports in the sides of the pod or nozzle structure. The hot gas stream may then be laterally and forwardly discharged therethrough for reverse thrust. Axial movement of this frame is controlled by a set of first actuators. Pivotal movement of the flap is controlled by a set of second actuators. The first and second set of actuators are sequentially interconnected in such a fashion that both sets may be powered from a single source of pressurized hydraulic fluid through "hard" conduits. Valves are employed to enable independent operation of each set of actuators in providing the varying thrust capabilities of the nozzle.

7 Claims, 8 Drawing Figures

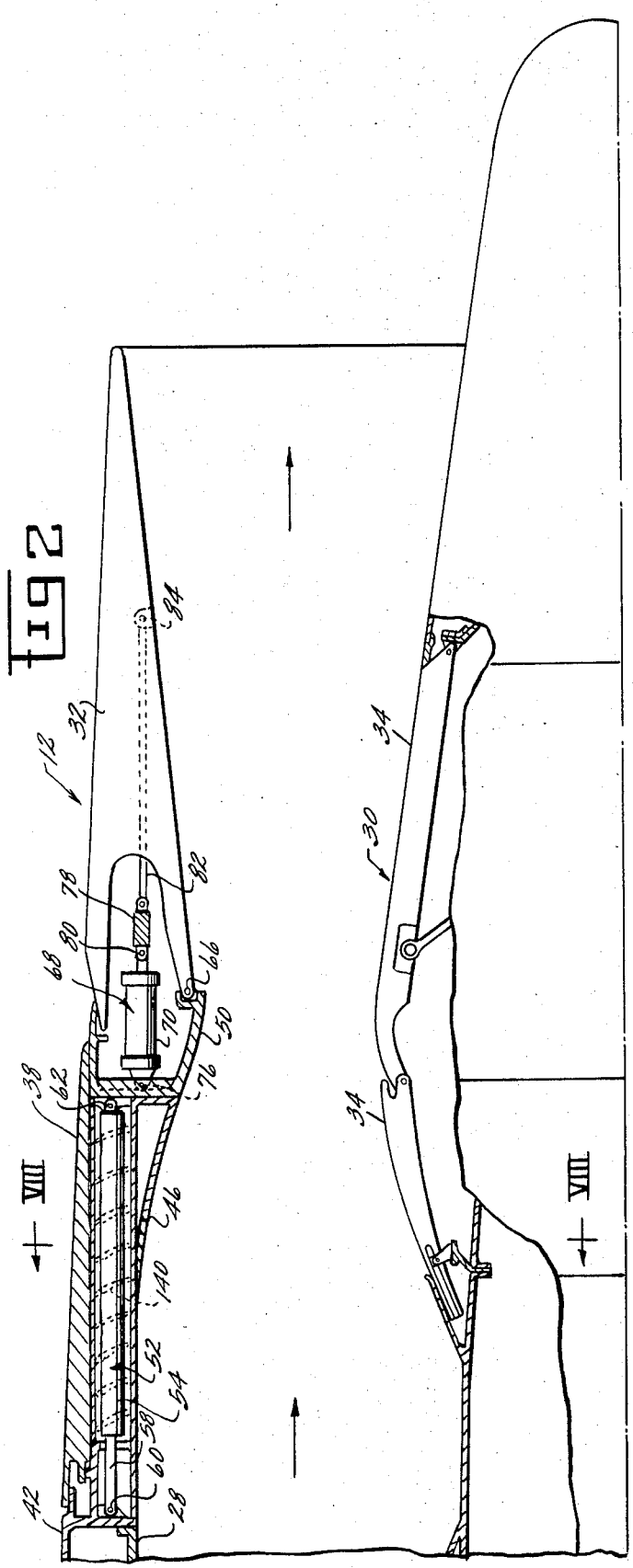

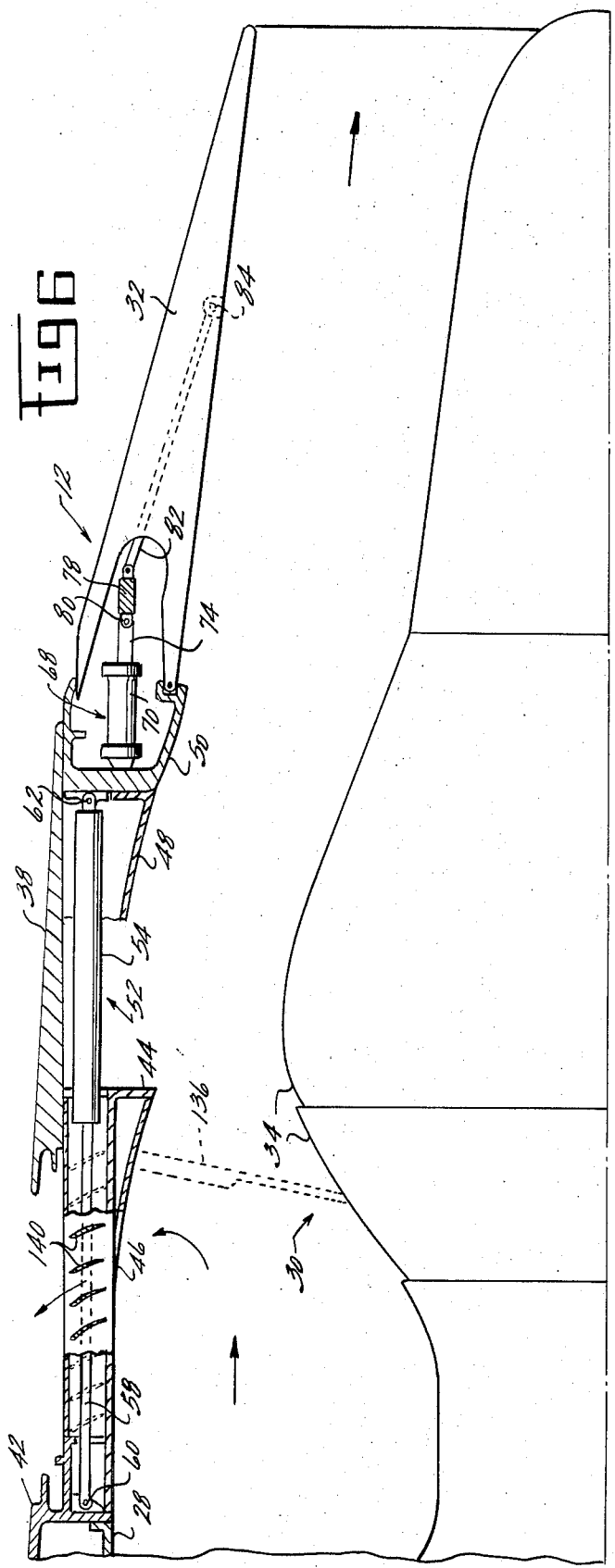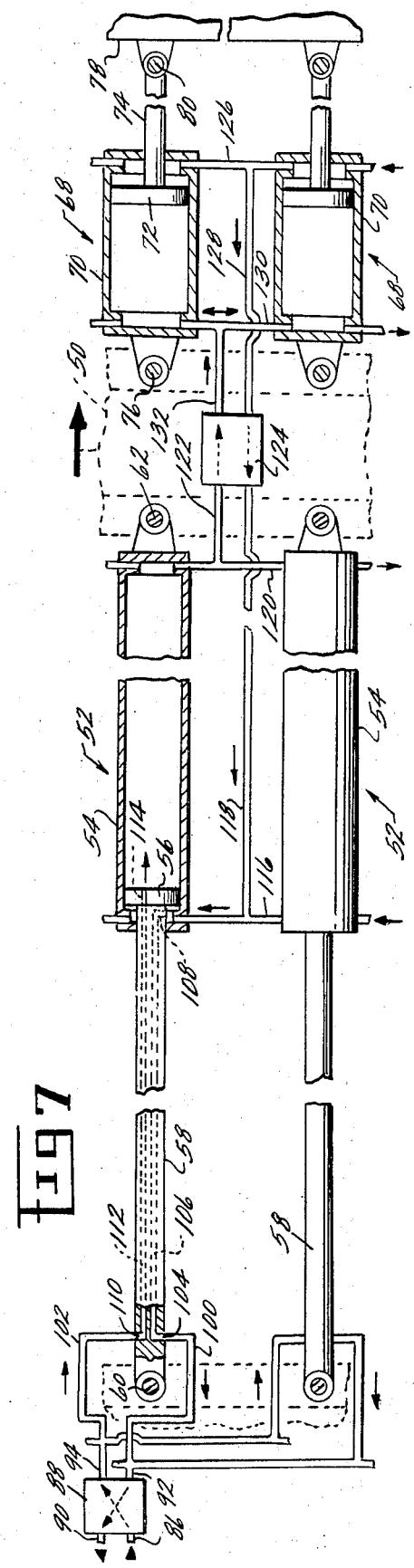

PROPULSION NOZZLE AND ACTUATOR SYSTEM EMPLOYED THEREIN

The present invention relates to improvements in propulsion nozzles, particularly of the type having supersonic capabilities and used in combination with gas turbine engines in the propulsion of aircraft, and further to improved hydraulic systems employed therein.

Many problems exist and have long been recognized in aircraft propulsion systems having supersonic capabilities. For practical purposes it may be considered that, for supersonic propulsion, a convergent-divergent propulsion nozzle is a necessity. For subsonic operation a convergent nozzle is required for efficient operation. Since the subsonic portion of an overall flight regime may equal, or often exceed, the supersonic portion, a convergent nozzle configuration also becomes a practical necessity by reason of the economies to be derived therefrom.

Many different nozzles have been proposed, and several previously utilized, to obtain both convergent and convergent-divergent configurations for different flight conditions from subsonic through supersonic. Such nozzles mostly incorporate pivotal flaps and are commonly referred to as variable geometry nozzles.

Another problem in basic nozzle configuration is maintaining a minimum length. It has previously been recognized that the use of a central plug can shorten the overall nozzle length and thus plug nozzles and variable geometry, plug nozzles have been developed toward the general end of providing for the different flight conditions as well as reducing overall nozzle length.

Beyond this, nozzle constructions become further complicated in providing reverse thrust capabilities as is particularly required in commercial aircraft. These complications are due to the fact that reverse thrust is most effectively attained by diverting the hot gas stream, employed for forward propulsion, in a lateral and forward direction and the further fact that such diversion must be done in the general area of the propulsion nozzle.

One solution to these overall problems is to pivotally mount flaps, which define the discharge area of the nozzle, on a frame which is axially displaceable to uncover lateral discharge ports, through which the hot gas stream of the engine may be discharged for reverse thrust. Such a configuration however, poses particular problems in controlling the pivotal positions of the flaps for varying operating conditions of forward propulsion, and also displacing this frame to provide the reverse thrust capability.

While cylinder type actuators provide an obvious expedient for controlling movement of the nozzle frame and flaps, the adverse environment of the propulsion nozzle, subject to gas stream temperatures in excess of 2,000 degrees Fahrenheit, militates against incorporation of any conventional actuator system. This becomes more apparent upon further appreciation of the fact that it is required or desired to positively displace the frame, on which the flaps are mounted, through a substantial distance, as well as to positively and independently pivot the flaps relative to such frame. Any known conventional system of actuators would involve the use of flexible conduits for the pressurized motive fluid for the actuators. Such flexible conduits, while basically sound in principle, do not approach the degree of reliability, simplicity, and compactness of "hard" conduits, particularly when carrying pressurized hydraulic motive fluid and operating under such adverse environmental conditions of extreme temperatures, and also vibration.

Accordingly, one object of the present invention is to provide an improved propulsion nozzle having pivotal flaps to accommodate supersonic and subsonic operation as well as having provision for reverse thrust capability and in so doing to provide for positive control of the component parts of such a nozzle through an actuator system which eliminates any requirement for flexible conduits carrying pressurized motive fluid for the actuators.

Another object of the present invention is to provide a hydraulic control system for a propulsion nozzle wherein first and second actuators, either individually or in sets thereof, are sequentially connected for independent operation thereof, in controlling movement of a propulsion nozzle frame and flaps mounted thereon, or for controlling movement of other elements connected to such actuators.

These ends are broadly attained by a propulsion nozzle mountable at the discharge of a gas turbine engine and comprising a pod structure having downstream extensions between ports for lateral discharge of hot gas during thrust reversal. Downstream of these extensions is a frame on which are mounted flaps for controlling the discharge area of the nozzle. A central plug may also be provided and incorporate flaps for controlling the throat area of the nozzle.

A first set of actuators is mounted within the pod extensions for axially translating the referenced frame to shift shroud means thereon between a forward thrust position wherein the reverse thrust ports are closed and a reverse thrust position wherein these ports are open. A second set of actuators is mounted on this movable frame for controlling the pivotal positions of the flaps and the discharge area of the nozzle.

The two sets of actuators are sequentially connected, from a relatively fixed supply, for flow of pressurized fluid therethrough, in controlling translation of the frame and pivoting of the flaps. Valve means may be employed to provide for energization of one set of flaps independently of the other. The connections between the actuators may provide for flow of pressurized fluid as well as discharge of fluid to a drain or the like, as in a closed hydraulic fluid pressurization system. The interconnections between the two sets of actuators are made between actuator components which are connected to the nozzle frame so that there is no linear displacement and "hard" conduits, or other rigid elements may be employed for greater reliability and other related advantages.

In yet a broader sense of the invention, the two sets of actuators, or single actuators from each set may be interconnected in a similar fashion to control movement of first and second members relative to each other and to a fixed member.

The above and other related objects and features of the invention will be apparent from a reading of the following description of the of the disclosure found in the accompanying drawings and the novelty thereof pointed out in the appended claims.

In the drawings:

FIG. 2 is an enlarged, longitudinal section of a portion of the propulsion nozzle, positioned for supersonic propulsion;

FIG. 3 is a diagrammatic illustration of a hydraulic system, employed in the present invention in a position corresponding to FIG. 2;

FIG. 4 is a section similar to that of FIG. 2, but showing the nozzle positioned for subsonic operation;

FIG. 5 is a diagrammatic illustration of the hydraulic system in a position corresponding to FIG. 4;

FIG. 6 is a section also corresponding to that of FIG. 2, but showing the nozzle positioned for reverse thrust;

FIG. 7 is a schematic view of the hydraulic system in a position corresponding to FIG. 6.

Figure 1:
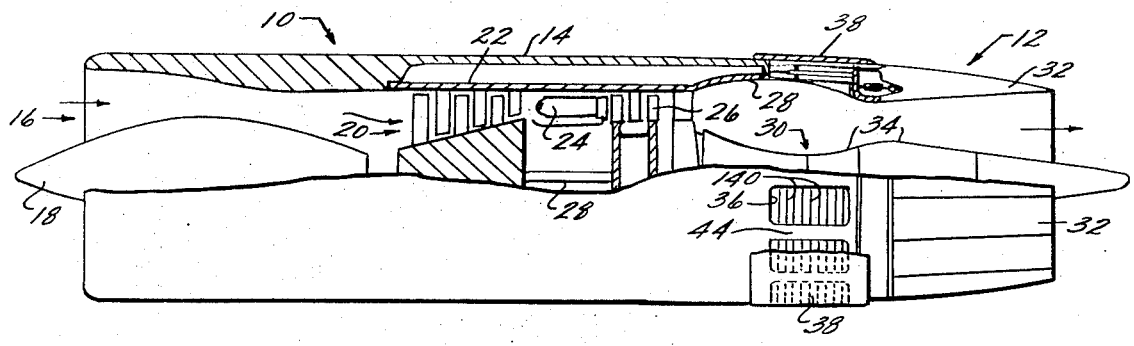
FIG. 1 is a diagrammatic illustration of a gas turbine engine and propulsion nozzle embodying the present invention.

FIG. 1 illustrates a gas turbine engine 10 and a propulsion nozzle 12. The manner of mounting, i.e. the installation of, the engine 10 and nozzle 12 can vary widely between different types of aircraft. For sake of illustration a relatively fixed pod structure 14 is shown, which may be mounted on the aircraft by a pylon, or the like, not shown herein. The pod 14 would be compositely formed and define at one end the outer bounds of an inlet 16 which, for supersonic operation, may also include an axi-symmetrical spike 18. In supersonic operation, air entering the inlet 16 is shocked down to a subsonic velocity. Inlet air enters the engine compressor 20 and is pressurized and then discharged to a combustor 24 to support combustion of fuel in the generation of a hot gas stream. A portion of the energy of the hot gas stream is extracted by a turbine 26 to drive the rotor of the compressor 20 through a shaft 27. The hot gas stream then flows to the nozzle 12 and the remaining energy of the hot gas stream is converted to a propulsive force as it is discharged therefrom.

Gas flow from the turbine 26 is defined, at its outer bounds, by a compositely formed casing 28 which, in effect, is an extension of the engine casing 22, leading to the nozzle 12. Within the discharge casing 28 and extending the length of the nozzle 12 is a plug 30 which is an aerodynamic component of the nozzle. The nozzle 12 is also of the variable geometry type comprising an outer set of flaps 32 and expansible flaps 34 on the plug 30. The nozzle 12 in supersonic operation is predominantly a convergent-divergent nozzle as is further illustrated in FIG. 2. The flaps 32 are pivoted to control the discharge area of the nozzle, and the flaps 34 are pivoted, in an expansible fashion, to control the throat area of the nozzle, as taught in U.S. Pat. No. 3, 237, 864 of common assignment. The flaps 32 and 34 are pivotal to aerodynamically form a convergent nozzle for subsonic propulsion, FIG. 4.

The nozzle 12 also incorporates reverse thrust capabilities wherein normal rearward discharge of the hot gas stream is blocked and directed laterally and forwardly through ports 36 provided in the nozzle structure. In forward propulsion these ports are covered by a shroud 38 which is translated downstream for reverse thrust operation as will later be described in detail.

Figure 8:
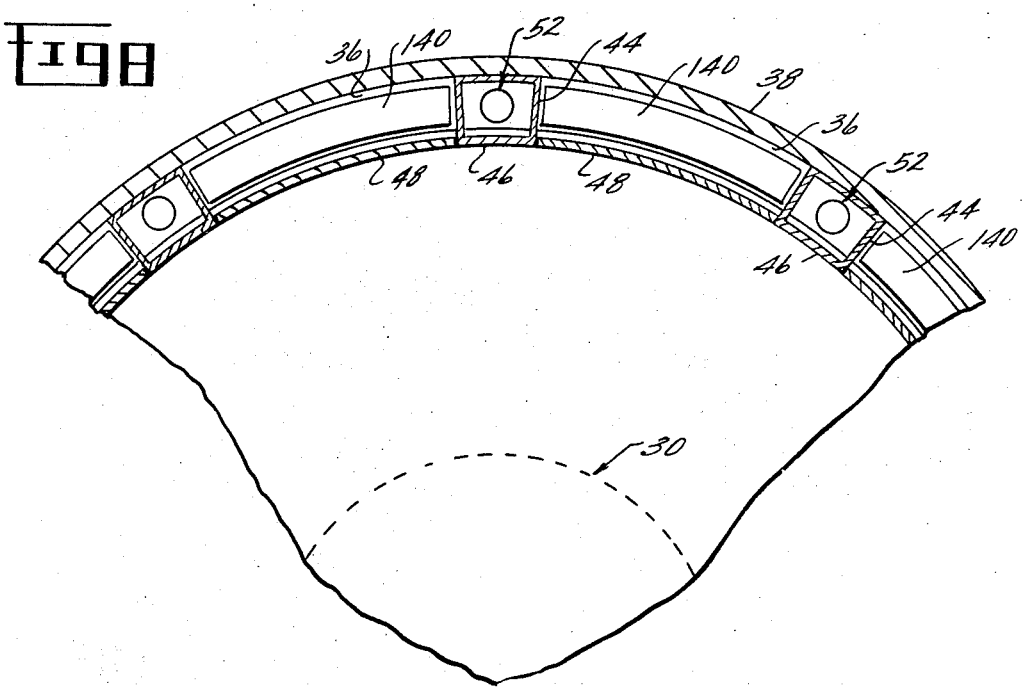
FIG. 8 is a section taken generally on line VIII—VIII in FIG. 2.
Figures 4, 5:
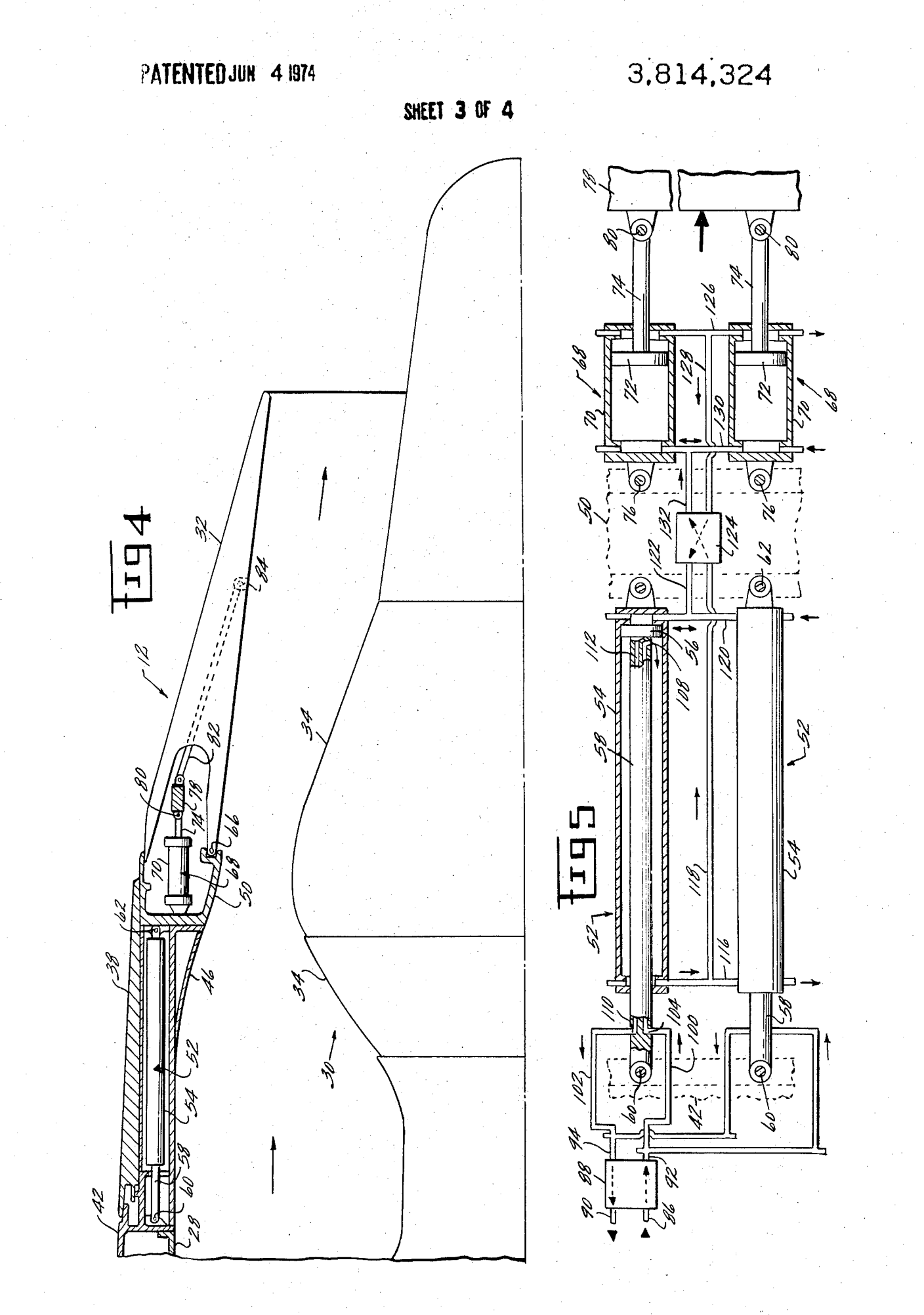

The compositely formed discharge duct 28 includes a pod frame member 42, (FIGS. 2, 4 and 6). A plurality of hollow extensions 44, see also FIG. 8, project downstream from the frame 42 between the ports 36. The inner surfaces 46 of the extensions 44 and plates 48 define the outer bounds of the flow path of the hot gas stream leading to the throat of the nozzle 12. The plates 48 are secured to a frame (best shown in FIG. 6) 50 to which the shroud 38 is also secured. Frame 50 is guided by the shroud 38 and extensions 44 for axial movement from the position illustrated in FIG. 2 to the position illustrated in FIG. 6.

The axial movement of the frame 50 is controlled by a plurality of actuators 52 which are disposed generally within the extensions 44 and thus protected from direct exposure to the hot gas stream passing through the nozzle 12. Three or more actuators 52 are preferably employed, each being mounted in selected, spaced extensions 44. However, for simplicity of description and illustration, a single actuator is shown in FIGS. 2, 4, 6 and 8, and only two of the actuators 52 are shown in the diagramatic views of FIGS. 3, 5 and 7. As will be seen from FIG. 3, the actuators 52 comprise basic components including an outer cylinder 54, a piston 56, slidable therein, and a piston rod 58 extending, from one side of the piston 56, through the rod end of the cylinder adjacent the pod frame 42. The piston rods 58 are pivotally attached to the pod frame 42 at 60. The cylinders 54 are pivotally connected to the nozzle frame 50 at 62.

Again referencing FIGS. 2 and 4 and the nozzle flaps 32, these flaps are pivotally mounted at 66 on the annular frame 50. The flaps 32 are generally triangular in shape, being feathered at their downstream ends, with their outer surfaces generally aligned with the pod structure for good aerodynamic performance. The flaps 32 are pivotally positioned relative to the frame 50 by a second set of actuators 68. Again a plurality of actuators 68 may be employed, generally three or more in number. However, for sake of illustration, only one actuator 68 is shown in FIGS. 2, 4 and 6 and only two such actuators are illustrated in the diagramatic views of FIGS. 3, 5 and 7. The actuators 68 correspond to the actuators 52 in each comprising a cylinder 70 within which rides a piston 72. A piston rod 74 extends from one side of the piston, beyond the downstream end of the cylinder 70. The cylinders 70 are pivotally mounted on the frame 50 at 76 and the piston rods 74 are pivotally connected to a unison ring 78 at 80. Links 82 are pivotally connected at their opposite ends to the unison ring 78 and each of the flaps 32 at 84. It will be apparent that axial movement of the unison ring 78 imparts pivotal movement to the flaps 32 as will be evidenced by a comparison of FIGS. 2 and 4.

Next to be described is the system for providing pressurized hydraulic fluid to the actuators 52 and 68 and thus controlling the position of the frame 50 and the flaps 32. Referencing first FIG. 3, a pressurization conduit 86, at the fixed pod frame 42, is connected to an appropriate source of pressurized hydraulic fluid, as is commonly found in such engines or in the aircraft system itself. The pressurization conduit 86 is connected to a valve 88 which also has extending therefrom a drain conduit 90 which is connected to the sump or drain side of the hydraulic pressurization system. A pair of conduits 92 and 94 extend from the opposite side of the valve 88 and are connected to plenum conduits 96 and 98 respectively. A conduit 100 connects each of the actuators 52 to the common plenum 96. More specifically, each of the conduits 100 extends to a port 104 formed in the piston rod 58, outside the cylinder 54, for connection with a passageway 106 extending axially through the piston rod 58 to a port 108 adjacent the rod end side of the piston 56. Conduits 102 extend respectively to a port 110 formed in each piston rod 58, outside the cylinder 54, and connect with a passageway 112 extending axially through the piston rod 58 to a port 114 on the head end side of the piston 56. For simplicity herein the end of the cylinder from which the piston rod 58 projects will be called the "rod end." The rod ends of each of the cylinders 54 are interconnected by conduits 116 which in turn connect to a single or common conduit 118. The head ends of the cylinders 54 are interconnected by conduits 120 which are jointed to a single or common conduit 122. Conduits 118, 122 are connected to a valve 124 which is mounted on the nozzle frame 50.

The rod ends of the cylinders 70, of the actuators 68, are interconnected by conduits 126 to a single or common conduit 128. Similarly the head ends of the cylinders 70 are interconnected by conduits 130 and connected to a single or common conduit 132. The conduits 128 and 132 are in turn connected to the valve 124.

FIG. 3 illustrates the flow paths of hydraulic fluid through the valves 88 and 124 to obtain the supersonic propulsion position illustrated in FIG. 2. Thus it will be seen that pressurized fluid flows sequentially from the conduit 86, through valve 88, conduit 92, plenum conduit 96, conduits 100, piston rod passageways 106 to pressurize the rod ends of the cylinders 54 and maintain the pistons and piston rods in the retracted positions. Sequential flow then continues from the rod ends of the cylinders through conduits 116, common conduit 118, valve 124, common conduit 128 to also pressurize the rod ends of the cylinders 70, thus maintaining the piston rods 74 in their retracted positions and the flaps 32 in their positions of maximum divergence illustrated in FIG. 2. Also, in this condition, the head ends of the cylinders 70 are connected through conduits 130, common conduit 132, valve 124, common conduit 122 and conduits 120 to the head ends of the cylinders 54, then through the passageways 112, conduits 102 to the plenum conduit 98 and then back through the valve 88 to the drain conduit 90.

The valves 88 and 124 may take the form of servovalves, well known to those skilled in the art, and would be controlled by signal imputs from either the pilot of the aircraft or from automatic controls which adjust the nozzle geometry in accordance with the operating conditions of the aircraft engine and propulsion system in a known manner. Thus, for example, in certain regimes it is desirable that the flaps 32 be swung inwardly under certain supersonic flight conditions, or wholly inwardly as illustrated in FIG. 4 for subsonic propulsion. In either event the valve 88 is maintained in its position illustrated in FIG. 3, and then pressurized fluid from the common conduit 118 is switched by the valve 124, see FIG. 5, to the common conduit 132 at the same time the common conduit 128 is switched for connection with the common conduit 122. Thus the head ends of the cylinders 70 are pressurized to extend the piston rods 74 and displace the unison ring 78 in a downstream direction and pivot the flaps 32 to the position of FIG. 4. At the same time the rod ends of the cylinders are drained, through the actuators 52, back to the drain conduit 90. The servovalve 124 further has the capability, again known to those skilled in the art, of balancing pressures on opposite sides of the piston 72 to maintain it in an intermediate position within the cylinder 70 to thus maintain the flaps 32 also in intermediate positions.

Although not illustrated herein, it is contemplated that, in accordance with well known practices, synchronizing means would be employed to maintain at all times uniform travel of the piston rods 58 and 74, such means may take various forms such as worms and worm wheels interconnected by flexible cables. It will also be noted that the position of the plug flaps 34 varies between FIGS. 2 and 4. This function forms no part of the present invention and may be accomplished by means as taught in the previous referenced U.S. Pat. No. 3,237,864.

When reverse thrust is desired or required, the frame 50 is shifted axially downstream from the position of FIGS. 2 and 4 to the position of FIG. 6. This is achieved by switching flow through the valve 88. When this is done, as indicated in FIG. 7, the common plenum 98 becomes pressurized, directing pressurized fluid through the piston rod passageway 112 to the head ends of the cylinders 54. At the same time the common passageway or plenum passageway 96 is connected to the hydraulic system drain conduit 90 and the rod ends of the cylinders 54 are depressurized through rod passageways 106. The pistons 56 are displaced to extend the piston rods 58 and thereby displace the frame 50 in the downstream position of FIG. 6.

When this occurs the shroud 38 and the plates 48 are displaced from the ports 36 and the hot gas stream is then free to be discharged therethrough. For most effective reverse thrust operation, blockers 136 are disposed in the hot gas stream flow path at the downstream ends of the ports 36. Further, louvers 140 may be placed in the discharge ports 36 to better direct the hot gas stream in a forwardly direction to increase reverse thrust capabilities. The blockers 136 may be mechanically linked to the frame 50 or otherwise actuated for deployment in blocking relation, as described. Such means, however, form no part of the present invention.

If it is desired to maintain the flaps 32 in their inwardly swung positions during reverse thrust operation, flow of pressurized fluid through the valve 124 as is illustrated in FIG. 7. In this position, with the head ends of the cylinders 54 pressurized, pressurized fluid flows through the valve 124 to the head ends of the cylinders 70 so that the piston rods 74 are maintained in their extended positions. If the valve 124 is not switched as shown in FIG. 7, the flaps 32 will be swung outwardly. Additionally, the flaps could be maintained in their inward positions, when the frame 50 is so displaced, by shifting the valve to a position wherein flow between the conduits 118, 122 and 128, 132 is blocked.

The described embodiment of the invention is highly effective in obtaining the desired control of the described propulsion nozzle components for both supersonic, subsonic and reverse thrust operation. In so doing the actuators therefor are protected at all times from any substantial, direct exposure, to the extremely high elevated temperatures of the gas stream. Further, these ends are accomplished in a manner which enables "hard" conduits to be employed. "Hard" conduit, as used herein, includes both passageways formed in rigid members such as the piston rod passageways 106, 112, as well as separate conduit elements formed of relatively rigid integral tubing commonly used to transmit high pressure fluids. In particular, with regard to this aspect of the invention, it will be noted that none of the conduits employed herein extend between components which have relative linear movement therebetween. The only such relative movement is only a very minimal pivotal movement as found in the common conduits 128 and 132 which extend between the pivotal cylinders 70 and the relatively fixed valve 124. However, the extent of such motion or movement is nominal and may be readily taken by "hard" conduit tubing without the necessity of so called, compositely, formed flexible conduits. All of this gives a high degree of reliability to the nozzle system and the hydraulic components thereof.

While uniquely related to the described propulsion nozzle, it will be appreciated that, in the broader aspect of the invention, the hydraulic system herein has further utility both in the general field of propulsion nozzles and in other fields where hydraulic actuation systems requiring a great degree of flexibility, and further requiring the elimination of flexible interconnecting conduits, is required or desirable. Additionally, it would be appreciated that some of the valving means described herein could be simplified or eliminated where the pressurized motive fluid is not recycled, as for example, in pneumatic systems. The spirit and scope of the present invention concepts is therefor to be derived solely from the following claims.

Having thus described the invention, what is novel and desired to be secured by letters Patent of the United States is:

1. A propulsion nozzle for use in combination with a gas turbine engine or the like wherein a motive fluid stream is introduced into one end of the nozzle and discharged from the other end thereof to provide a propulsive force, said nozzle comprising a relatively fixed, annular frame member having angularly spaced extensions projecting downstream therefrom, an annular, movable, frame member downstream of said extensions, said movable frame having a retracted position for forward propulsion and an extended position for reverse thrust, a plurality of flaps pivotally mounted on said movable frame member and defining the discharge area of said nozzle, a plurality of ports angularly spaced around said nozzle between said extensions, shroud means secured to said movable frame member and blocking the hot gas flow through said ports when said movable frame member is in its retracted position, said shroud being clear of said parts in the extended position of said movable frame, a plurality of first actuators respectively disposed within selected frame extensions, each first actuator comprising a cylinder element and a piston element, with one element thereof connected to the fixed frame and the other element connected to the movable frame, a plurality of second actuators spaced around the movable frame, each second actuator comprising a cylinder element and a piston element with one element thereof connected to the movable frame and the other element thereof connected to said flaps, and passageway means, connectable with a source of pressurized motive fluid at said fixed frame and extending from said fixed frame through the first actuator elements connected thereto, through the other elements of the first actuators and through the second actuator elements connected to the movable frame for sequential flow of motive fluid in powering said actuators.

2. A propulsion nozzle as in claim 1 further comprising passageway means extending from a drain conduit, at said fixed frame, through the actuator elements connected to said fixed frame, through the other first actuator elements and through the second actuator elements connected to said movable frame to provide for powering the actuators from a closed circuit, pressurized fluid system.

3. A propulsion nozzle as in claim 2 wherein the passageway means include a first valve mounted on said fixed frame with pressurization and drain conduits connected to one side thereof, passageways extending from the opposite side of the first valve through the actuator elements connected to the fixed frame and respectively entering the cylinder elements on opposite sides of the pistons thereof, a second valve mounted on the movable frame, passageways extending through the other first actuator elements from opposite ends of the cylinders thereof and respectively connected to said second valve, passageways extending through the elements of the second actuators connected to said movable frame from opposite ends of the cylinder elements thereof and respectively connected to the other side of the second valve, said first valve being shiftable to selectively connect the pressurization and drain conduits with either of the passageways connected to the opposite side of the first valve, said second valve being shiftable to respectively connect the two passageways from the first actuators with either of the two passageways extending to the second actuators, whereby the flaps may be pivoted or the movable frame translated in providing for supersonic propulsion, subsonic propulsion or reverse thrust.

4. A propulsion nozzle as in claim 3 further comprising plates secured to said frame in underlying relation to said ports and forming, in combination with the inner surfaces of said extensions, a portion of the hot gas flow path when the movable member is on its retracted position, and further wherein the cylinder elements of the first and second actuators comprise cylinders having a head end at one end thereof the piston elements of the first and second actuators comprise pistons slidable in said cylinders and rods extending from one side thereof and extending through the other, rod ends of the cylinders, the head ends of the first and second actuators are respectively, pivotally connected to the movable frame, the outer ends of the first actuator piston rods are respectively, pivotally connected to the fixed frame, the outer ends of the second actuator piston rods are respectively, pivotally connected to a unison ring, and links respectively connect the unison ring to said flaps to impart pivotal movement thereto.

5. A propulsion nozzle as in claim 4 wherein the passageway means include plenum conduits respectively connected to the first valve, first and second passageways extending longitudinally of each first actuator piston rod from ports outside the cylinders therefor to ports disposed respectively on opposite sides of its pistons and adjacent thereto, conduits connecting the outside port of each first passageway with one plenum conduit, conduits connecting the outside port of each second passageway with the other plenum conduit, conduits interconnecting the rod ends of said first actuator cylinders, conduits interconnecting the head ends of said first actuator cylinders, common conduits respectively connecting said interconnecting conduits to one side of said second valve, conduits interconnecting the head ends of the second actuator, conduits interconnecting the rod ends of said second actuator cylinders and common conduits respectively connecting the interconnecting conduits of the second actuator cylinders with the other side of said second valve.

6. A propulsion nozzle as in claim 5 wherein the second valve is a servovalve selectively positionable to balance the pressures on opposite sides of said second actuator pistons and maintain said flaps in intermediate positions and also positionable to block flow of fluid through said common conduits.

7. A propulsion nozzle as in claim 6 further comprising a plug disposed centrally within said nozzle and having expansible flaps for varying the throat area of the nozzle.

* * * * *